United States Patent
Akolkar et al.

(10) Patent No.: US 9,576,048 B2
(45) Date of Patent: Feb. 21, 2017

(54) COMPLEX SERVICE NETWORK RANKING AND CLUSTERING

(71) Applicant: International Business Machines Corporation, Armonk, NY (US)

(72) Inventors: Rahul P. Akolkar, Tuckahoe, NY (US); Thomas E. Chefalas, Somers, NY (US); Yexi Jiang, Miami, FL (US); Jim A. Laredo, Katonah, NY (US); Chang-Shing Perng, Goldens Bridge, NY (US); Anca Sailer, Scarsdale, NY (US); Frank A. Schaffa, Hartsdale, NY (US); Alla Segal, Mount Kisco, NY (US); Ignacio Silva-Lepe, Putnam Valley, NY (US); Tao Tao, Briarcliff Manor, NY (US); Yang Zhou, Atlanta, GA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 282 days.

(21) Appl. No.: 14/315,370

(22) Filed: Jun. 26, 2014

(65) Prior Publication Data
US 2015/0379121 A1    Dec. 31, 2015

(51) Int. Cl.
G06F 17/30    (2006.01)

(52) U.S. Cl.
CPC ................ *G06F 17/30707* (2013.01)

(58) Field of Classification Search
CPC .............. G06F 17/3053; G06F 17/30707
See application file for complete search history.

(56) References Cited

U.S. PATENT DOCUMENTS

| | | | |
|---|---|---|---|
| 6,078,866 A | 6/2000 | Buck et al. |
| 6,546,388 B1 | 4/2003 | Edlund et al. |
| 6,766,316 B2 | 7/2004 | Caudill et al. |
| 6,862,586 B1 | 3/2005 | Kreulen et al. |
| 7,024,404 B1 | 4/2006 | Gerasoulis et al. |
| 7,065,494 B1 | 6/2006 | Evans |
| 7,269,587 B1 | 9/2007 | Page |
| 7,840,569 B2 | 11/2010 | Meyerzon et al. |

(Continued)

OTHER PUBLICATIONS

Skoutas et al., "Ranking and Clustering Web Services Using Multicriteria Dominance Relationships", IEEE transactions on Services Computing, vol. 3, No. 3, Jul.-Sep. 2010.*

(Continued)

*Primary Examiner* — Khanh Pham
(74) *Attorney, Agent, or Firm* — Louis J. Percello; Otterstedt, Ellenboge & Kammer, LLP

(57) ABSTRACT

Offline functionality-based co-ranking and clustering is carried out on a knowledge base that characterizes a heterogeneous information technology services network including a plurality of services, a plurality of providers, and a plurality of attributes. Results of the functionality-based co-ranking and clustering are stored as annotations of the services and the providers in the knowledge base, to obtain an annotated knowledge base. A service requirement is obtained from a customer requiring information technology services. The annotated knowledge base is queried, based on the service requirement; and an ordered list of at least given ones of the services, based on the querying, is returned to the customer.

14 Claims, 12 Drawing Sheets

(56) References Cited

U.S. PATENT DOCUMENTS

| | | | |
|---|---|---|---|
| 7,904,561 B2* | 3/2011 | Chan | G06Q 30/0217 705/14.19 |
| 7,962,470 B2* | 6/2011 | Degenkolb | G06F 17/30893 707/709 |
| 7,962,487 B2 | 6/2011 | Liu et al. | |
| 8,145,623 B1 | 3/2012 | Mehta et al. | |
| 8,185,536 B2 | 5/2012 | Basu et al. | |
| 8,265,078 B2 | 9/2012 | Masputra et al. | |
| 2002/0107852 A1 | 8/2002 | Oblinger | |
| 2003/0185368 A1 | 10/2003 | Bradfield et al. | |
| 2004/0122926 A1* | 6/2004 | Moore | G06F 17/30864 709/223 |
| 2007/0112867 A1 | 5/2007 | Evans et al. | |
| 2008/0270374 A1 | 10/2008 | Li et al. | |
| 2008/0278755 A1 | 11/2008 | Martin | |
| 2009/0132491 A1* | 5/2009 | Desaraju | G06Q 30/00 707/999.003 |
| 2011/0213785 A1 | 9/2011 | Kristiansson et al. | |
| 2011/0225293 A1 | 9/2011 | Rathod | |
| 2012/0197993 A1 | 8/2012 | Skomoroch et al. | |

OTHER PUBLICATIONS

Peter Mell & Tim Grance, "The NIST Definition of Cloud Computing" Version 16, Oct. 7, 2009, downloaded from http://csrc.nist.gov/groups/SNS/cloud-computing.

Yang Zhou et al., Ranking Services by Service Network Structure and Service Attributes, presented at IEEE 20th International Conference on Web Services, Jun. 27-Jul. 2, 2013, Santa Clara Marriott, CA, USA (Grace Period Disclosure).

Songyun Duan et al. A clustering-based approach to ontology alignment. ISWC 2011.

Jon M. Kleinberg. Authoritative Sources in a Hyperlinked Environment. SODA 1998.

Glen Jeh, Jennifer Widom. SimRank: a measure of structural-context similarity. Science 2002.

Cuiping Li et al. Fast computation of SimRank for static and dynamic information networks. EDBT 2010.

Nir Ailon et al. Aggregating inconsistent information: Ranking and clustering. J.ACM, vol. 55(5), 2008.

Dimitrios Skoutas. Ranking and Clustering Web Services using Multi-Criteria Dominance Relationships. TSC 2010. abstract only.

Jian Li et al. A Unified Approach to Ranking in Probabilistic Databases. VLDB 2009.

Alexander Kotov and Chengxiang Zhai. Interactive Sense Feedback for Difficult Queries. CIKM, 2011.

Makoto Iwayama. Relevance feedback with a small number of relevance judgments: Incremental relevance feedback vs. document clustering. SIGIR, 2000.

Bin Tan, Atulya Velivelli, Hui Fang and Chengxiang Zhai. Term feedback for information retrieval with language models. SIGIR, 2007.

"Social Influence Based Clustering of Heterogeneous Information Networks" by Yang Zhou and Ling Liu, Proceedings of the 19th ACM SIGKDD International Conference on Knowledge Discovery and Data Mining, pp. 338-346, ACM New York, NY, USA 2013, Presented in Chicago, IL, USA, Aug. 11-14, 2013.

C. Bizer and A. Schultz, "The berlin sparql benchmark," IJSWIS, 5(2), pp. 1-24, 2009.

S. P. Lloyd, "Least squares quantization in PCM" IEEE Transaction on Information Theory, 28(2), pp. 128-137, 1982.

D. Arthur and S. Vassilvitskii, "K-means++: The Advantages of Careful Seeding," in SODA, 2007, pp. 1027-1035.

"k-medoids" Downloaded Jun. 26, 2014 From Wikipedia, the free encyclopedia, http://en.wikipedia.org/wiki/K-medoids, Describes Work of Kaufman, L. and Rousseeuw, P.J. From 1987.

\* cited by examiner

Algorithm 1 Disjoint Clustering Matching

Input: a heterogeneous service network $G = (V, A, E)$, a disjoint clustering $S_1, \ldots, S_k, P_1, \ldots, P_k$, a unified random walk distance matrix $R$, and a queue $Q$ containing triples of conflict cluster labels.

Output: a $1 \times k$ vector $CL$ containing the new cluster label for the matched clusters of $S$ or $P$.

1: $X = argmin_{i \in \{S,P\}} d(\overline{c}_L), Y = argmax_{i \in \{S,P\}} d(\overline{c}_L);$
2: $CL = (0, 0, \ldots, 0); Q = \emptyset;$
3: Calculate $pd(X_i, Y_j)$ for $i, j = 1, \ldots, k;$
4: for $j = 1, \ldots, k$
5: $\quad CL(j) = argmin_{i \in \{1, \ldots, k\}} pd(X_i, Y_j);$
6: $\quad EnQueue(Q, (i, m, n))$ for $CL(m) = CL(n) = i, m < n;$
7: while $QueueEmpty(Q) == False$
8: $\quad DeQueue(Q, (i, m, n));$
9: $\quad$ if $CL(m) == CL(n)$
10: $\quad\quad j = argmin_{i \in \{m,n\}} d(X_i, Y_i);$
11: $\quad\quad CL(j) = argmax_{i' \in \{1, \ldots, k\}, i' \neq i} pd(X_{i'}, Y_j);$
12: $\quad\quad EnQueue(Q, (i', m', n'))$ for $CL(m') = CL(n') = i',$ $m' < j;$
13: $\quad\quad EnQueue(Q, (i', j, n'))$ for $CL(j) = CL(n') = i',$ $j < n';$
14: Update each $Y_j$'s cluster label as $CL(j)$.

*FIG. 5*

Algorithm 2 ServiceRank

Input: a heterogeneous service network $G$, a length limit $l$ of random walk paths, a restart probability $c$, a cluster number $k$.

Output: service ranking $sr(t)(\cdot,\cdot)$ in each cluster.

1: $\alpha_{SS} = \alpha_{SP} = \alpha_{PS} = \alpha_{PP} = \beta_1 = \ldots = \beta_m = 1.0$;
2: Generate the local optimal weights through the algorithm in [11];
3: Calculate $T$ in Eq.(1) and $R$ in Eq.(11);
4: Execute $k$-Medoids to produce clusters $S_1, \ldots, S_k$, $P_1, \ldots, P_k$;
5: Match $S_1, \ldots, S_k$ to $P_1, \ldots, P_k$ through Algorithm 1;
6: Repeat until convergence:
7: Get probabilistic clusters $sc(t)(\cdot,\cdot)$ in Eq.(19);
8: Get local ranking $sr(t)(\cdot,\cdot)$ in Eq.(22);
9: Update all $e_{ij}$s in Eq.(23);
10: Recalculate $T$ and $R$.

*FIG. 6*

COMPLEX SERVICE NETWORK RANKING AND CLUSTERING

STATEMENT OF GOVERNMENT RIGHTS

Not Applicable.

CROSS-REFERENCE TO RELATED APPLICATIONS

Not Applicable.

STATEMENT REGARDING PRIOR DISCLOSURES BY THE INVENTOR OR A JOINT INVENTOR

The following disclosure(s) are submitted under 35 U.S.C. 102(b)(1)(A):
DISCLOSURE(S): Yang Zhou et al., Ranking Services by Service Network Structure and Service Attributes, presented at IEEE 20th International Conference on Web Services, Jun. 27-Jul. 2, 2013, Santa Clara Marriott, Calif. USA (expressly incorporated herein by reference in its entirety for all purposes).

FIELD OF THE INVENTION

The present invention relates to the electrical, electronic and computer arts, and, more particularly, to information technology (IT) service provision and the like.

BACKGROUND OF THE INVENTION

Web service ranking is a significant functionality in web service discovery, search, mining and recommendation. Many popular web service networks are content-rich in terms of heterogeneous types of entities, attributes and links.

SUMMARY OF THE INVENTION

Principles of the invention provide techniques for complex service network ranking and clustering. In one aspect, an exemplary method includes the step of carrying out offline functionality-based co-ranking and clustering on a knowledge base. The knowledge base characterizes a heterogeneous information technology services network including a plurality of services, a plurality of providers, and a plurality of attributes.

Further steps include storing results of the functionality-based co-ranking and clustering as annotations of the services and the providers in the knowledge base, to obtain an annotated knowledge base; obtaining a service requirement from a customer requiring information technology services; querying the annotated knowledge base, based on the service requirement; and returning to the customer an ordered list of at least given ones of the services, based on the querying.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects.

These and other features and advantages of the present invention will become apparent from the following detailed description of illustrative embodiments thereof, which is to be read in connection with the accompanying drawings.

BRIEF DESCRIPTION OF THE DRAWINGS

FIG. 5 depicts a disjoint clustering matching technique, in accordance with an aspect of the invention;

FIG. 6 depicts a service rank technique, in accordance with an aspect of the invention;

DETAILED DESCRIPTION OF PREFERRED EMBODIMENTS

Cloud Computing Aspects

Figure 1:
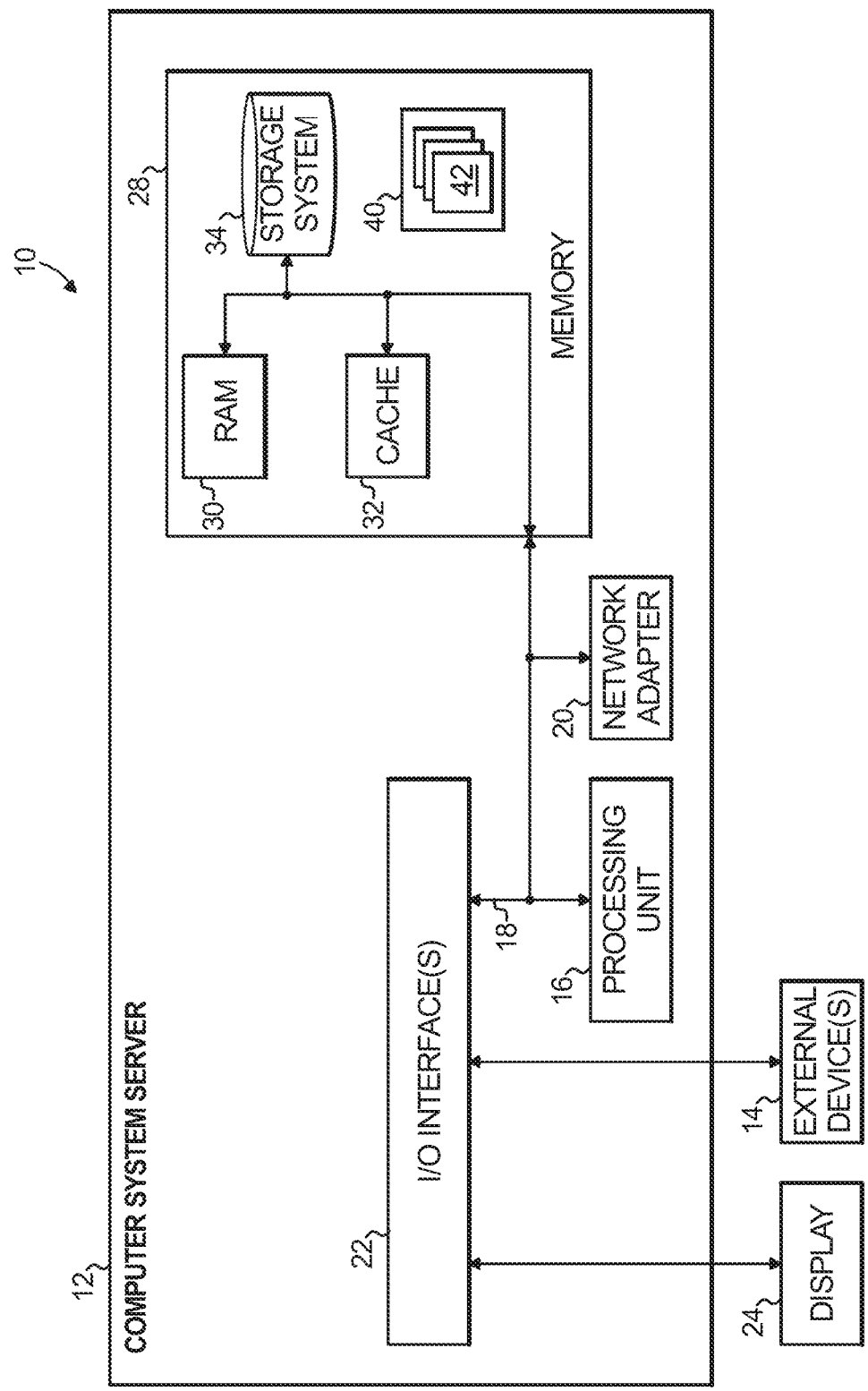
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
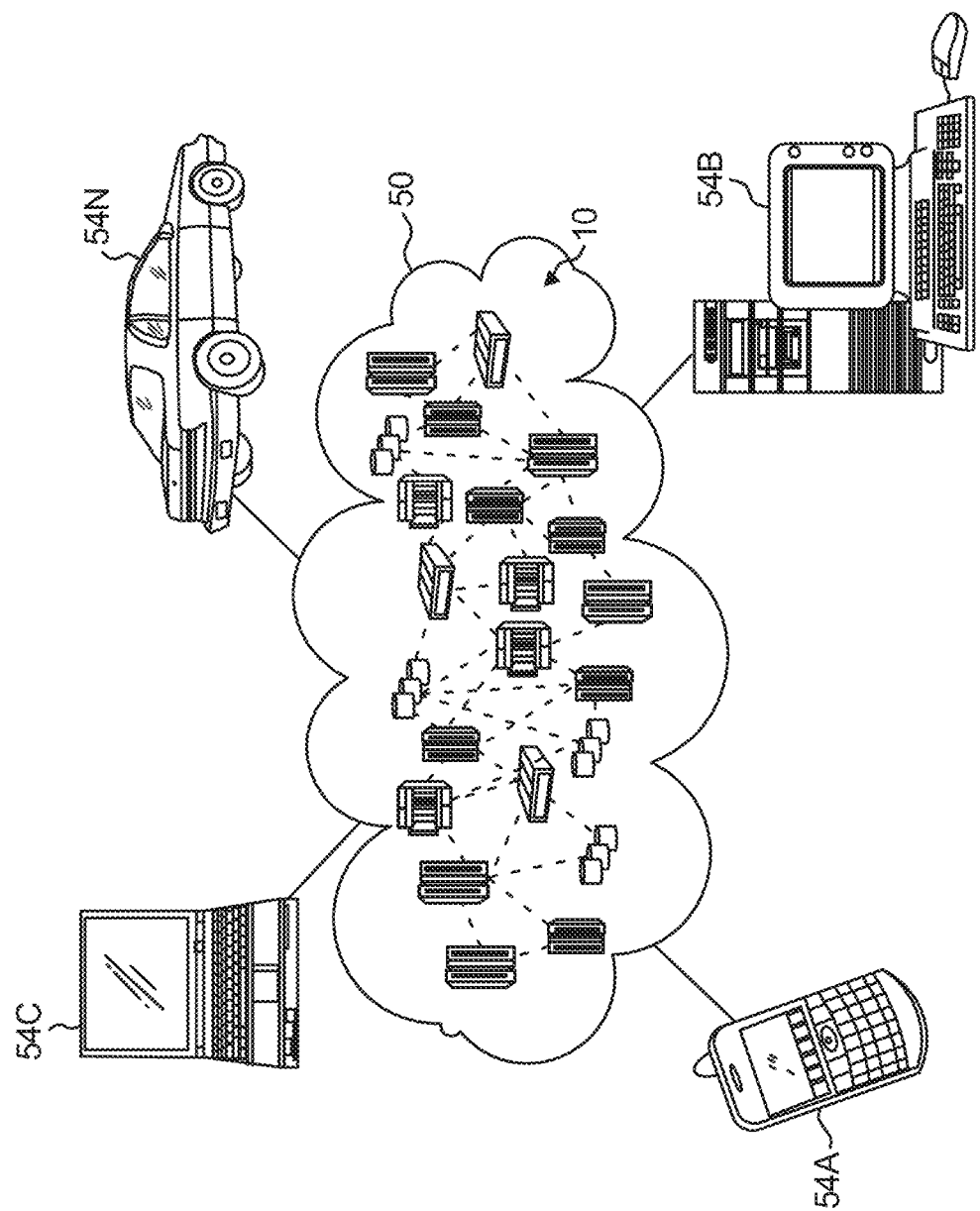
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
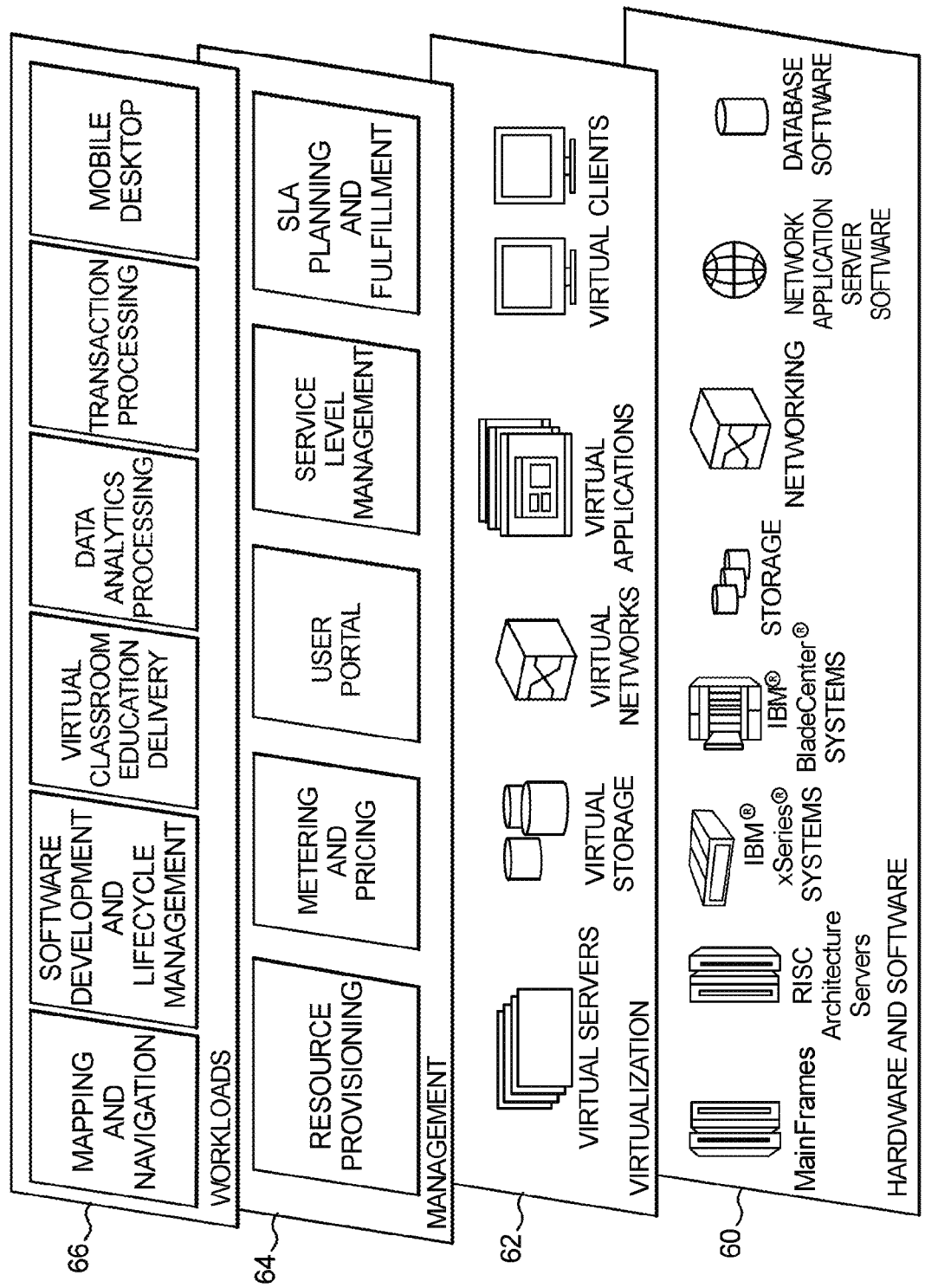
FIG. 3 depicts abstraction model layers according to an embodiment of the present invention.

FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided: Hardware and software layer 60 includes hardware and software components.

Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation;

software development and lifecycle management; virtual classroom education delivery; data analytics processing; transaction processing; and mobile desktop.

As noted, web service ranking is a significant functionality in web service discovery, search, mining and recommendation. Many popular web service networks are content-rich in terms of heterogeneous types of entities, attributes and links. One pertinent challenge for ranking services is how to incorporate multiple complex and heterogeneous factors, such as service attributes, relationships among services, relationships between services and service providers or service consumers, into the design of service ranking functions. One or more embodiments model services, attributes, and the associated entities, such as providers, consumers, by a heterogeneous service network. One or more embodiments provide a unified neighborhood random walk distance measure, which integrates various types of links and vertex attributes by a local optimal weight assignment. Based on this unified distance measure, a reinforcement technique, "ServiceRank," is provided to tightly integrate ranking and clustering by mutually and simultaneously enhancing each other such that the performance of both can be improved. An additional clustering matching strategy is provided, in at least some instances, to efficiently align clusters from different types of objects. Non-limiting exemplary evaluation on both synthetic and real service networks demonstrates the effectiveness of ServiceRank in terms of the quality of both clustering and ranking among multiple types of entity, link and attribute similarities in a service network.

Thus, given a complex service network with multiple types of services, providers, consumers and relationships, one or more embodiments efficiently rank and recommend services or providers to help customers find suitable services and/or providers to satisfy their needs. Typically, service users do not have specific knowledge of existing service or provider information so that they cannot specify their service requirements correctly. Furthermore, in at least some instances, service providers need to provide more services to meet user's additional requirements and improve their existing service quality and ranking in their area. One or more embodiments enable the extraction and representation of metadata as semantic annotations to services. One or more embodiments discover meaningful service patterns in a complex service network with multiple types of entities and relationships, and present results to the user in a meaningful way.

In one or more embodiments, the top k best ranked services or providers are based on multiple types of entities and relationships. Good ranking generates good clustering, and good clustering promotes good ranking One or more embodiments provide a co-ranking mechanism to rank multiple types of entities in each cluster; similarity metrics between the same type of entities or relationships; and/or recommendation of services or providers based on their similarity and ranking list.

With the increasing popularity of web services, web service management is becoming an interesting and challenging research problem which has received much attention recently. Service network analysis has emerged as a significant aspect of web service management in both industry and academic research. Many popular web service networks are content-rich in terms of heterogeneous types of entities and links, associated with incomplete attributes. Such web service networks expose two heterogeneity challenges: (i) Multiple types of entities co-exist in the same service network with various attributes, and (ii) Links between entities have different types and carry different semantics.

Figure 4:
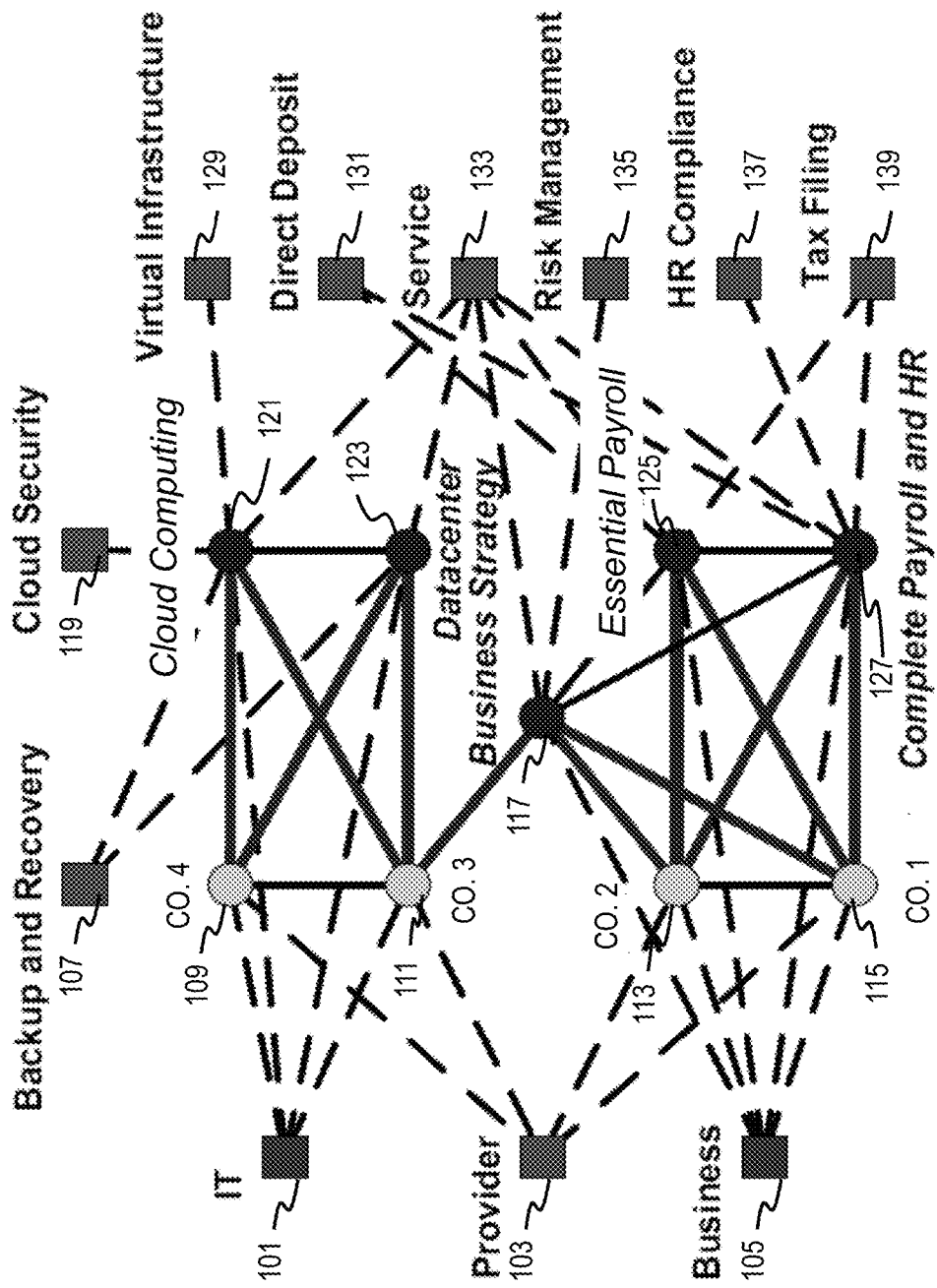
FIG. 4 depicts a heterogeneous service network, in accordance with an aspect of the invention.

FIG. 4 presents a real service network. There are two kinds of object vertices: service vertices 117, 121, 123, 125, 127 and provider nodes 109, 111, 113, 115. Each service vertex may contain three types of properties: "Type" 103, 133; "Category" 101, 105; and "Capability" 107, 119, 129, 131, 135, 137, and 139. Each provider vertex may have two kinds of attributes: "Type" attribute and "Category" property. On the other hand, there are three kinds of links: the thinner solid lines 113-115, 117-127, 117-125, 125-127, 109-111, and 121-123 specify the structure relationship between objects with the same type; the thicker solid edges represent the "Provides" relationship between services and providers; and a dashed edge denotes the attribute edge between object and its attribute.

Typical applications of web service management include service retrieval and selection, service ranking and recommendation, service clustering and discovery, service adaptation and composition, and so on. Among these applications, service clustering and ranking are two significant ones. Ranking entails assigning a score to each service, quantifying its characteristics based on some ranking criteria. With such criteria, "interesting" services to response a specific user request appear high in the returned list. Prominent web ranking algorithms such as HITS and PageRank as well as service ranking methods rank webpages or services on the whole homogeneous network so that the most relevant webpages or services are presented on the top of the returned list. On the other hand, clustering partitions a service network into groups so that services within a cluster are densely connected based on a certain similarity measure. Most existing graph clustering techniques have focused on the topological structures of homogeneous graph based on various criteria.

Although clustering and ranking are two well-known analytical tools for web service management, existing service clustering and ranking approaches are usually regarded as two independent processes. As a result, at least two drawbacks characterize such approaches. First, clustering the entire service network without considering service's ranking may result in incorrect clustering results. Suppose providers company 4 109, company 1 115 and their associated links are removed from FIG. 4. Then service "Business Strategy" 117 has only two providers company 3 111 and company 2 113. If it is desired to partition vertices into two clusters, then company 3 111 and company 2 113 will be in cluster "IT" and cluster "Business," respectively. Consider which cluster "Business Strategy" should fall into. Second, ranking services on the whole service network without considering which groups they belong to often leads to biased ranking results. If the global ranking algorithm is adopted to rank all services in FIG. 4, then service "Business Strategy" has a higher score than service "Datacenter" since "Business Strategy" has more peer services and is provided by more providers. This ranking result does not make sense for a customer seeking an "IT" service. However, integrating clustering and ranking together can lead to more comprehensible results. In the first case, "Business Strategy" will belong to cluster "Business" since both "Business Strategy" and "company 2" rank high in cluster "Business" and rank low in cluster "IT" but "company 3" has oppositional ranking performance in both clusters so that "Business Strategy" and "company 2" are more similar. For the second scenario, "Datacenter" will have a higher score than "Business Strategy" in cluster "IT" if all services in each cluster are ranked.

One or more embodiments rank and cluster services on a heterogeneous service network. First, integrate various types of links and attributes into a unified distance model to estimate the pairwise vertex closeness on the heterogeneous service network. Second, design a robust probabilistic clustering method for heterogeneous service network to make one or more embodiments applicable to a wide range of applications. Third, design a more useful service ranking approach with combining ranking information from peer services, providers and associated attributes. Finally, one or more embodiments provide a framework that smoothly integrates ranking and clustering techniques.

One or more embodiments provide one or more of:

A unified neighborhood random walk distance measure integrating various types of links and attribute information with the local optimal weight assignment on a heterogeneous service network.

A greedy strategy to efficiently execute cluster matching processes to align clusters for each type of objects on the heterogeneous service network.

A general algorithm that smoothly integrates ranking and clustering techniques, while mutually enhancing the individual performance of each of those techniques.

Presented herein are non-limiting exemplary experimental results demonstrating the effectiveness and efficiency of one or more embodiments on both synthetic and real datasets.

Consider the problem formulation of service clustering and ranking, taking into account both service network structure and service attribute information. A heterogeneous service network is denoted as G=(V, A, E), where V represents the set of object vertices, A denotes the set of property vertices, and E contains multiple types of edges between object or property vertices. V contains two types of object vertices: the service set S and the provider set P, i.e., V=S∪P. $A=\{a_{11}, \ldots, a_{1n_1}, \ldots, a_{m1}, \ldots, a_{mn_m}\}$ represents m associated attributes and their values for describing object properties. Note that the subscript of the second element is $1n_1$ and that of the third element is $mn_m$. $Dom(a_i)=\{a_{i1}, \ldots, a_{in_i}\}$ represents the domain of attribute $a_i$ with a size of $|Dom(a_i)|=n_i$. Note that the subscript of the last element is $in_i$. An attribute vertex $v_{ij} \in A$ represents that attribute $a_i$ takes the $j^{th}$ value. An attribute edge $(v_i, v_{jk}) \in E$ iff vertex $v_i$ takes the value of $a_{jk}$ on attribute $a_j$. Thus, there are five types of edges between different kinds of vertices: $E=E_{SS} \cup E_{PP} \cup E_{SP} \cup E_{SA} \cup E_{PA}$ where subscripts S, P and A represent the service set, the provider set and the attribute set, respectively. For ease of presentation, refer to an edge between object vertices, i.e., $e \in E_{SS} \cup E_{PP} \cup E_{SP}$, as a structure edge and an edge between object and attribute, i.e., $e \in E_{SA} \cup E_{PA}$, as an attribute edge.

In such a heterogeneous service network with various types of objects, links and attributes, a good measure of "similarity" between objects is crucial to efficient social network analysis on real applications. A unified neighborhood random walk distance measure is to measure the closeness between vertices based on connectivity, vicinity and transition probabilities at different types of vertices.

Given k initial disjoint clusters of G=(V, A, E) for each type of object, $S = \cup_{i=1}^{k} S_i$ ($S_i \cap S_j = \phi$; $\forall i \neq j$) and $P = \cup_{i=1}^{k} P_i$ ($P_i \cap P_j = \phi$; $\forall i \neq j$) as the initial service influence, service influence based probabilistic clustering executes service influence propagation to partition each service $s \in S$ into each of k clusters based on the dynamic social activities with the initial disjoint service clusters and provider clusters. In the final clustering result, $\Sigma_{i=1}^{k} P_{si} = 1$ $\forall s \in S$ where $p_{si}$ represents the normalized probability of service s will be partitioned into the $i^{th}$ cluster. A desired clustering of a heterogeneous service network should achieve a good balance between the following two properties: (1) services within one cluster are close to each other in terms of structure links, while services between clusters are distant from each other; and (2) services within one cluster have similar properties, while services between clusters could have quite different attribute values.

Given a service influence based probabilistic clustering, service influence based ranking involves ranking each service $s \in S$ and each provider $p \in P$ in each of k clusters based on some heuristics rules so that good service ranking generates good provider ranking, and good provider ranking promotes good service ranking.

Consider a unified weighted distance measure. In a heterogeneous service network, each service is associated with a service set and a provider set through structure links and an attribute set through attribute links. One or more embodiments employ a unified distance measure based on the neighborhood random walk model to integrate various types of structural and attribute similarities. In the heterogeneous service network, there exists a random walk path between two services $s_1, s_2 \in S$ if (1) $s_1$ and $s_2$ have the same peer service $s_3 \in S$; (2) both $s_1$ and $s_2$ are provided by the same provider $p \in P$; or (3) $s_1$ and $s_2$ have the same attribute value $a \in A$. If there are multiple paths connecting $s_1$ and $s_2$, then they are close. On the other hand, if there are very few or no paths between $s_1$ and $s_2$, then they are far apart.

Definition 1 (Transition Probability Matrix): Let S be the service set, P be the provider set, and A be the set of associated attribute vertices; the transition probability matrix T of a heterogeneous service network G is then defined as follows.

$$T = \begin{bmatrix} T_{SS} & T_{SP} & T_{SA} \\ T_{PS} & T_{PP} & T_{PA} \\ T_{AS} & T_{AP} & T_{AA} \end{bmatrix} \quad (1)$$

where $T_{SS}$ is an $|S| \times |S|$ matrix representing the transition probabilities between service vertices; a $|P| \times |P|$ matrix $T_{PP}$ specifies the transition probabilities between provider vertices; $T_{SP}$ or $T_{PS}$ represents the transition probabilities between services and providers; $T_{SA}$ or $T_{AS}$ denotes the transition probabilities between services and attributes; $T_{PA}$ or $T_{AP}$ represents the transition probabilities between providers and attributes; and $T_{AA}$ is an $|A| \times |A|$ matrix with all zeroes since there is no edge between attribute vertices. Here, $|S|$, $|P|$ and $|A|$ represent the cardinalities of the service set S, the provider set P and the attribute set A, respectively.

Since each type of structure and attribute edges may have different degrees of contribution in random walk distance, assign each type of edge an individual weight. $T_{SS}$, $T_{SP}$, $T_{PS}$ and $T_{PP}$ correspond to four kinds of structure edges, and the corresponding structure weights are defined as $a_{SS}$, $a_{SP}$, $a_{PS}$ and $a_{PP}$, respectively. Notice that $a_{SP}$ is equal to $a_{PS}$ since edges have no orientation in an undirected service network. On the other hand, there are m associated attributes with object vertices in the service network. The attribute edges connected to attribute vertices $v_{i1}, \ldots, v_{in_i}$ corresponding to attribute $a_i$ are assigned to an attribute weight $\beta_i$. Note that the subscript of the last element is $in_i$. One or more embodiments employ a dynamic weight tuning method to produce a local optimal weight assignment for various types of links; reference is made to Yang Zhou and Ling Liu, "Clustering social networks with entity and link heterogeneity," in GT Tech Report, Atlanta, 2011, and also to "Social Influence Based Clustering of Heterogeneous Information Networks" by Yang Zhou and Ling Liu, Proceedings of the 19th ACM SIGKDD International Conference On Knowledge Discovery And Data Mining, Pages 338-346, ACM New York, N.Y., USA 2013. While the skilled artisan will be familiar with these two Yang Zhou and Ling Liu publications, nevertheless, out of an abundance of caution, both are hereby expressly incorporated by reference herein in their entireties for all purposes. Based on this weight assignment, each submatrix in T is defined as follows.

$$T_{SS}(i, j) = \begin{cases} \alpha_{SS} e_{ij}, & \text{if } (v_i, v_j) \in E_{SS} \\ 0, & \text{otherwise} \end{cases} \quad (2)$$

where $e_{ij}$ denotes the number of providers that service i and service j co-shared. When service i and service j have different types or are from different categories, $e_{ij}$ is usually equal to 0 since they often do not have the same providers.

$$T_{PP}(i, j) = \begin{cases} \alpha_{PP} e_{ij}, & \text{if } (v_i, v_j) \in E_{PP} \\ 0, & \text{otherwise} \end{cases} \quad (3)$$

where $e_{ij}$ is the number of services that provider i and provider j co-provided.

$$T_{PS}(i, j) = \begin{cases} \alpha_{PS} e_{ij}, & \text{if } (v_i, v_j) \in E_{PS} \\ 0, & \text{otherwise} \end{cases} \quad (4)$$

where $e_{ij}$ is the number of services j that provider i provided. $e_{ij}$ has a value of 0 or 1 since provider i may or may not provide service j in the original dataset. As the relationship between services and providers is symmetric, $T_{PS}(i, j)$ is equal to $T_{SP}(j, i)$ due to $a_{SP} = a_{PS}$.

$$T_{SA}(i, J) = \begin{cases} \beta_j e_{ijk}, & \text{if } (v_i, v_{jk}) \in E_{SA} \\ 0, & \text{otherwise} \end{cases}, J = k + \sum_{l=1}^{j-1} n_l \quad (5)$$

where $e_{ijk}$ denotes whether service i takes the $k^{th}$ value on attribute $a_j$. It also has a value of 0 or 1.

$$T_{AS}(I, j) = \begin{cases} e_{ijk}, & \text{if } (v_j, v_{ik}) \in E_{SA} \\ 0, & \text{otherwise} \end{cases}, I = k + \sum_{l=1}^{j-1} n_l \quad (6)$$

where $e_{ijk}$ specifies whether the $k^{th}$ value on attribute $a_i$ is taken by service j. The weight factor is ignored since each row in $T_{AS}$ corresponds to the same attribute vertex $v_{ik}$.

Since both services and providers are the subclass of objects, $T_{PA}$ and $T_{SA}$ have similar definitions and so have $T_{AP}$ and $T_{AS}$.

$$T_{PA}(i, J) = \begin{cases} \beta_j e_{ijk}, & \text{if } (v_i, v_{jk}) \in E_{PA} \\ 0, & \text{otherwise} \end{cases}, J = k + \sum_{l=1}^{j-1} n_l \quad (7)$$

where $e_{ijk}$ denotes whether provider i takes the $k^{th}$ value on attribute $a_j$.

$$T_{AP}(I, j) = \begin{cases} e_{ijk}, & \text{if } (v_j, v_{ik}) \in E_{PA} \\ 0, & \text{otherwise} \end{cases}, I = k + \sum_{l=1}^{j-1} n_l \quad (8)$$

where $e_{ijk}$ specifies whether the $k^{th}$ value on attribute $a_i$ is taken by provider j.

Since each row of the transition probability matrix should sum to 1, perform the row-wise normalization for T. Entries $T_{SS}(i, j)$, $T_{SP}(i, j)$ and $T_{SA}(i, j)$ are normalized by dividing them by the sum of row entries, i.e., $\Sigma_{l=1}^{|S|} T_{SS}(i,l) + \Sigma_{l=1}^{|P|} T_{SP}(i,l) + \Sigma_{l=1}^{|A|} T_{SA}(i,l)$. Similarly, elements $T_{PS}(i,j)$, $T_{PP}(i,j)$ and $T_{PA}(i,j)$ are normalized by $\Sigma_{l=1}^{|S|} T_{PS}(i,l) + \Sigma_{l=1}^{|P|} T_{PP}(i,l) + \Sigma_{l=1}^{|A|} T_{PA}(i,l)$. Entries $T_{AS}(i,j)$ and $T_{AP}(i,j)$ are normalized by $\Sigma_{l=1}^{|S|} T_{AS}(i,l) + \Sigma_{l=1}^{|P|} T_{AP}(i,l)$ since TAA is a zero matrix.

Definition 2 (Unified Neighborhood Random Walk Distance): Let T be the transition probability of a heterogeneous service network G, l be the length that a random walk can go, and $c \in (0, 1)$ be the restart probability, the unified neighborhood random walk distance d(u, v) from vertex u to vertex v in G is defined as follows.

$$d(u, v) = \sum_{\substack{\tau: \mathcal{U} \to v \\ length(\tau) \leq l}} p(\tau) c (1 - c)^{length(\tau)} \quad (9)$$

where τ is a path from u to v whose length is length(τ) with transition probability p(τ). d(u,v) reflects the vertex closeness based on multiple types of links among services, providers and attributes.

The matrix form of the unified distance is given as follows:

$$R = \sum_{\gamma=1}^{l} c(1-c)^\gamma T^\gamma \quad (10)$$

For ease of presentation, R is rewritten as the following form by using the similar representation in Eq. (1).

$$R = \begin{bmatrix} R_{SS} & R_{SP} & R_{SA} \\ R_{PS} & R_{PP} & R_{PA} \\ R_{AS} & R_{AP} & R_{AA} \end{bmatrix} \quad (11)$$

Consider service influence based clustering. One or more embodiments employ an innovative service influence based probabilistic clustering framework considering both social interactions between object vertices and social activities between object vertices and associated attribute vertices.

Clustering Matching Process: Most existing clustering methods such as k-Means and k-Medoids only offer disjoint clusters. These cannot be directly applied to a heterogeneous service network; otherwise they will lead to two issues: 1) service clusters and provider clusters are independent of each other; and 2) each object is partitioned into a single cluster. To address the first issue, the clustering matching process is designed, in one or more embodiments, to produce a one-to-one matching between service clusters and provider clusters based on some similarity measures.

The inter-cluster similarity with the same type is defined as follows:

$$d(\bar{c}_L) = \frac{1}{k(k-1)} \sum_{i=1}^{k} \sum_{j=1, j \neq i}^{k} d(c_L^i, c_L^j), L \in \{S, P\} \quad (12)$$

where $c_L^x$ represents the centroid of cluster $L_x$ and L specifies the service set (or the provider set). $d(c_L^i, c_L^j)$ is the unified distance from $c_L^i$ to $c_L^j$. $S = U_{i=1}^{k} S_i (S_i \cap S_{j=\phi}; \forall i \neq j)$ (or $P = U_{i=1}^{k} P_i (P_i \cap P_j = \phi; \forall i \neq j)$) is a disjoint clustering of services (or providers). A clustering of services (or providers) with a small inter-cluster similarity is considered as a good clustering based on this criterion.

The inter-cluster similarity across different types is designed to quantitatively measure the similar extent of a service cluster and a provider cluster. It is defined as follows.

$$d(X_i, Y_j) = \frac{1}{|X_i||Y_j|} \sum_{x \in X_i, y \in Y_j} d(x, y)(X, Y \in \{S, P\}, X \neq Y) \quad (13)$$

where X is a disjoint clustering of services (or providers) and Y is a disjoint clustering of providers (or services).

The disjoint clustering matching algorithm is presented in FIG. 5. It first chooses the clustering with the minimal inter-cluster similarity as the basic clustering X and the clustering with the maximal inter-cluster similarity as the clustering Y to be matched. The algorithm then calculates the inter-cluster similarity between X's clusters and Y's clusters and matches each cluster of Y to the cluster of X with the maximal inter-cluster similarity. It places the potential conflict cluster labels of Y and the corresponding cluster label of X into Q. During each "Dequeue" iteration, the algorithm rematches the one of two conflict clusters $Y_m$ and $Y_n$, whichever has smaller inter-cluster similarity with cluster $X_i$, and puts new possible conflict triples into Q until the queue is empty. Finally, it updates the cluster labels of Y with the matched cluster labels respectively.

Service Influence Propagation: The process of services influencing one another in a service network is very similar to the heat diffusion process. Heat diffusion is a physical phenomenon that heat always flows from an object with high temperature to an object with low temperature. In the context of a heterogeneous service network, an early service often influences other late services through links. For example, some "IT" company currently provides an early service of "Datacenter" but doesn't support a late service of "Cloud Computing." If there exists a direct connection between "Datacenter" and "Cloud Computing," then it is very possible that "Cloud Computing" will be provided by this company in the future. On the other hand, a provider may also transfer its influence to services provided by it. For instance, "company 3" provides both "Datacenter" and "Business Strategy" so that these two services have an indirect connection through the common provider "company 3." The spread of service influence resembles the heat diffusion phenomenon. Early choice of a provider (or a service) with many peers and services (or providers) in a cluster may act as heat sources, transfer its heat to its peers and services (or providers) and diffuse their influences to other majority. Finally, at a certain time, heat is diffused to the margin of the service network.

One or more embodiments use a unified random walk distance as the heat diffusion kernel since it captures the service (or provider) influence through both direct and indirect links. The heat diffusion kernel H is a submatrix of R in Eq. (11).

$$H = \begin{bmatrix} R_{SS} & R_{SP} \\ R_{PS} & R_{PP} \end{bmatrix} \quad (14)$$

One or more embodiments utilize the matched clusters of services and providers from the disjoint clustering process as the heat (influence) source. An $(|S|+|P|) \times k$ initial heat matrix sc(0) represents the heat source from which the heat kernel starts its diffusion process. The initial heat column vector sc(0)(i,j)(j=1, ..., k) of the service network at time 0 is defined below.

$$sc(0)(i,j) = (p_{1j}, \ldots, p_{|S|j}, p_{(|S|+1)j}, \ldots, p_{(|S|+|P|)j})^T \quad (15)$$

where $p_{ij}$ is the probability of the $i^{th}$ ($1 \leq i \leq |S|$) service vertex in cluster $S_j$ or the $(i-|S|)^{th}$ ($|S|+1 \leq i \leq |S|+|P|$) provider vertex in cluster $P_j$. Due to the disjoint clustering, each initial $p_{ij}$ is equal to 0 or 1 and $\Sigma_{j=1}^{k} p_{ij} = 1$; $\forall i$. Thus, sc(0) is given as follows.

$$sc(0) = [sc(0)(:,1), sc(0)(:,2), \ldots, sc(0)(:,k)] \quad (16)$$

where sc(0) essentially denotes the clustering distribution of services and providers after the clustering matching process.

Treat each $p_{ij} > 0$ as an initial influence source to execute the service influence propagation in each cluster until convergence, i.e., influence equilibrium. A service's partitioning not only depends on the cluster label of peer services but also lies on the cluster label of its providers. During the following influence propagation, a service continuously obtains the influences from its providers and peer services about the cluster selection until it arrives at the margin of the service network.

$$sc(1) = H \times sc(0) \quad (17)$$
$$\ldots$$
$$sc(t) = H \times sc(t-1)$$

Therefore, the service network's thermal capacity at time t, denoted by sc(t), is defined as follows.

$$sc(t) = H^t \times sc(0) \quad (18)$$

where sc(t) corresponds to a probabilistic clustering result, i.e., each entry sc(t)(i, j) represents the probability of the $i^{th}$ ($1 \leq i \leq |S|$) service or the $(i-|S|)^{th}$ ($|S|+1 \leq i \leq |S|+|P|$) provider in the $j^{th}$ cluster. Then normalize each sc(t)(i,j) so that $\Sigma_{l=1}^{k} sc(t)(i,l) = 1$.

$$sc(t)(i,j) = sc(t)(i,j)/(\Sigma_{l=1}^{k} sc(t)(i,l)) \quad (19)$$

Consider service influence based ranking. When ranking services over the global service network without considering which clusters the services belong to, there is no clear choice for the user, as to where to start looking at the results, since users usually prefer seeing a ranked result list in some area that they are interested in rather than a global ranked list. One or more embodiments employ ranking functionality to present services to the user in a meaningful way, i.e., by ranking them in each cluster based on a good clustering result. However, it is still not enough for a local ranking method to help the user efficiently distinguish the returned service list. The influence propagation among services and providers can provide more informative views of ranking results. The ranking of an early service usually influences other late peer services through the direct connection. On the other hand, a provider may transfer its influence to the ranking of services provided by it. Their influences are finally diffused to the entire service network through influence propagation.

The following heuristics rules are useful in one or more embodiments:

Highly ranked services in each cluster have connections with many highly ranked services within the same cluster.

Highly ranked services in each cluster are provided by many highly ranked providers within the same cluster.

Highly ranked providers in each cluster own many highly ranked peer providers within the same cluster.

Highly ranked providers in each cluster provide many highly ranked services within the same cluster.

One or more embodiments utilize H in Eq.(14) as the propagating heat diffusion kernel in the ranking process since it captures the direct connections between different types of objects based on the above four ranking rules. One or more embodiments use a $(|S|+|P|) \times k$ influence matrix $sr(0)$ to represent the initial ranking of services and providers in each cluster. The initial ranking score of the $i^{th}$ object vertex in $j^{th}$ cluster is defined below.

$$sr(0)(i, j) = \begin{cases} \sum_{l=1, l \neq i, sc(t)(l,j)>0}^{|S|+|P|} H(i, l), & \text{if } sc(t)(i, j) > 0 \\ 0, & \text{otherwise} \end{cases} \quad (20)$$

where $sr(0)(i; j)$ is the sum of the unified random walk distance from the $i^{th}$ ($1 \leq i \leq |S|$) service or the $(i-|S|)^{th}$ ($|S|+1 \leq i \leq |S|+|P|$) provider to other objects partitioned into cluster $sc(t)(i, j)$. If a service (or a provider) in a cluster is connected to many peers and many providers (or services) in the same cluster, then it will achieve a higher initial ranking score in this cluster. Then normalize each $sr(0)(i, j)$ so that $$\sum_{l=1}^{|S|+|P|} sr(0)(l, j) = 1 \quad (21)$$

$$sr(0)(i, j) = \frac{sr(0)(i, j)}{\sum_{l=1}^{|S|+|P|} sr(0)(l, j) = 1}$$

Thus, use the influence propagation to iteratively refine ranking scores based on the above heuristics rules.

$$sr(t)(:, j)H \times \begin{bmatrix} sr(t-1)(1:|S|, j) \\ sr(t-1)(|S|+1:|S|+|P|, j) \end{bmatrix}, \quad (22)$$

$$sr(t)(i, j) = \frac{sr(t)(i, j)}{\sum_{l=1}^{|S|+|P|} sr(t)(l, j)}$$

where $sc(t)(i,j)$ specifies the ranking score of each service (or provider) in cluster $sc(t)(i, j)$ at time t. During the influence propagation, a service's ranking is continuously refined by the ranking of its direct peers and providers as well as the ranking of these neighbors' neighbors. When the influence propagation reaches equilibrium, the final ranking score of a service in a cluster is jointly decided by the ranking scores of the services and providers in the same cluster which have at least one feasible path to this service.

The original service network often lacks enough topological information between entities. For example, a majority of connections between objects are "Provide" links between services and providers in an exemplary service network. One or more embodiments provide a similarity metric to discover hidden relationship between entities without direct links. Intuitively, two services are similar if they have similar cluster distribution and similar ranking scores in each cluster. The clustering and ranking based similarity is defined as follows.

$$e_{i,j} = 1 - \frac{\sum_{l=1}^{k} |sc(t)(i, l)sr(t)(i, l) - sc(t)(j, l)sr(t)(j, l)|}{\sum_{l=1}^{k} sc(t)(i, l)sr(t)(i, l) + sc(t)(j, l)sr(t)(j, l)} \quad (23)$$

$$\forall i, j \in \{1, \ldots, |S|+|P|\}$$

Substitute this new $e_{ij}$ for the old one in $T_{SS}(i,j)$, $T_{PP}(i,j)$, $T_{SP}(i,j)$, or $T_{PS}(i,j)$ and recalculate the matrices T and R to further improve the performance of both clustering and ranking.

By assembling different parts, an exemplary ranking algorithm, ServiceRank, is presented in FIG. 6. Steps 1 and 2 determine a local optimal weight assignment for various types of links. Step 3 calculates the transition probability matrix T and the unified random walk distance matrix R. Step 4 performs the clustering method, k-Medoids, to produce disjoint clusters of services and providers. The clustering matching process is then executed between service clusters and provider clusters in step 5. Steps 7-10 repeatedly run the service influence based clustering and ranking and iteratively update the clustering and ranking based similarity so that T and R are continuously refined to generate better ranking results until convergence.

Non-limiting exemplary experimental results will now be considered, including evaluation on both synthetic and real service datasets. Initially, consider several experimental datasets.

BSBM Dataset: Modify the BSBM data generator and create a dataset with 246,161 triples where "Provides" is used to model the relationship between "Service" and "Providers" providing them, while an instance of "Service" has multiple instances of properties "Capability," "Function" and "Type", and an instance of "Provider" contains multiple instances of properties "Feature" and "Type". There are totally 10,000 "Service" instances and 3,628 "Provider" instances with 10 "Type" instances and 5 instances of "Capability," "Function" and "Feature," respectively. Reference is made to C. Bizer and A. Schultz, "The berlin sparql benchmark," IJSWIS, 5(2), pp. 1-24, 2009. While the skilled artisan will be familiar with the C. Bizer and A. Schultz paper, nevertheless, out of an abundance of caution, the same is hereby expressly incorporated by reference herein in its entirety for all purposes.

IBM Service Dataset: The dataset contains a total of 41,292 triples with 2,450 "Service" instances and 928 "Provider" instances. Each "Service" instance may have three types of properties: "Type," "Category" and "Capability,"

respectively. On the other hand, each "Provider" instance may contain two kinds of properties: "Type" and "Category." In one or more embodiments, build a service network where object vertices represent services or providers, attribute vertices denote their properties, object edges represent the relationship between object vertices, and attribute edges specify the relationship between object vertices and their associated attributes.

Consider comparison methods and evaluation. Compare ServiceRank with three representative ranking algorithms, HITS, PageRank and Sim-Rank. Since the last three ranking algorithms cannot directly handle a heterogeneous network, treat services, providers and attributes as homogeneous vertices with the same type and rank homogeneous vertices in each cluster. Choose three disjoint clustering methods of k-Means (known to the skilled artisan from, for example, S. P. Lloyd, "Least squares quantization in PCM" IEEE Transaction on Information Theory, 28(2), pp. 128-137, 1982, hereby expressly incorporated by reference herein in its entirety for all purposes), k-Means++ (known to the skilled artisan from, for example, D. Arthur and S. Vassilvitskii, "K-means++: The Advantages of Careful Seeding," in SODA, 2007, pp. 1027-1035, hereby expressly incorporated by reference herein in its entirety for all purposes) and k-Medoids (known to the skilled artisan from, for example, L. Kaufman and P. J. Rousseeuw, "Clustering by means of medoids," Statistical Data Analysis based on the L1 Norm, pp. 405-416, 1987, and the Wikipedia article "k-medoids," both of which are hereby expressly incorporated by reference herein in their entireties for all purposes) for these three ranking algorithms, respectively. ServiceRank integrates various types of entity, link and attribute information into a unified distance measure with the local optimal weights on a heterogeneous service network. Service influence based clustering and ranking are iteratively performed to mutually enhance the performance of both of them.

Consider evaluation measures. Use three measures of density, entropy and Davies-Bouldin Index (DBI) to evaluate the quality of clusters $\{S_i\}_{i=1}^k$ and $\{P_i\}_{i=1}^k$ generated by different methods. The metrics are defined as follows.

$$\text{density}(\{S_i \cup P_i\}_{i=1}^k) = \sum_{i=1}^k \frac{\sum_{v_p,v_q \in S_i \cup P_i, (v_p,v_q) \in E} \min(\pi_{pi}, \pi_{qi})}{|E|} \quad (24)$$

where $\pi_{pi}$, $\pi_{qi}$ represent the probabilities of vertex $v_p$ and vertex $v_q$ in the $i^{th}$ cluster respectively. $\min(\pi_{pi}, \pi_{qi})$ is equal to 1 for disjoint clustering methods but may be less than 1 for probabilistic clustering.

$$\text{entropy}(\{S_i \cup P_i\}_{i=1}^k) = \quad (25)$$

$$\sum_{i=1}^m \frac{\beta_i}{\sum_{l=1}^m \beta_l} \sum_{j=1}^k \frac{|S_j|}{|S|} \text{entropy}(a_i, S_j) + \frac{|P_j|}{|P|} \text{entropy}(a_i, P_j)$$

where $\text{entropy}(a_i, S_j) = -\Sigma_{l=1}^{|S|} p_{ijl} \log_2 p_{ijl}$ and $p_{ijl}$ is the percentage of services in cluster $S_j$ which have value $a_{il}$ on attribute $a_i$. $\text{entropy}(\{S_i \cup P_i\}_{i=1}^k)$ measures the weighted entropy from all attributes over k clusters.

$$DBI(\{S_i \cup P_i\}_{i=1}^k) = \frac{1}{2k} \sum_{i=1}^k \max_{j \neq i} \left( \frac{d(c_S^j, c_S^i)}{\sigma_S^i + \sigma_S^j} \right) + \max_{j \neq i} \left( \frac{d(c_P^j, c_P^i)}{\sigma_P^i + \sigma_P^j} \right) \quad (26)$$

where $c_S^x$ ($1 \leq x \leq k$) is the centroid of cluster $S_x$, $d(c_S^i, c_S^j)$ is the random walk distance between centroids $c_S^i$ and $c_S^j$, and $\sigma_S^x$ ($1 \leq x \leq k$) is the average similarity of all elements in cluster $S_x$ to centroid $c_S^x$. $\text{entropy}(a_i, P_j)$, $c_P^x$, $d(c_P^i, c_P^j)$ and $\sigma_P^x$ corresponding to providers P have similar meanings A cluster with high intra-cluster similarity and low inter-cluster similarity will have a low DBI value.

Figures 7, 8, 9:
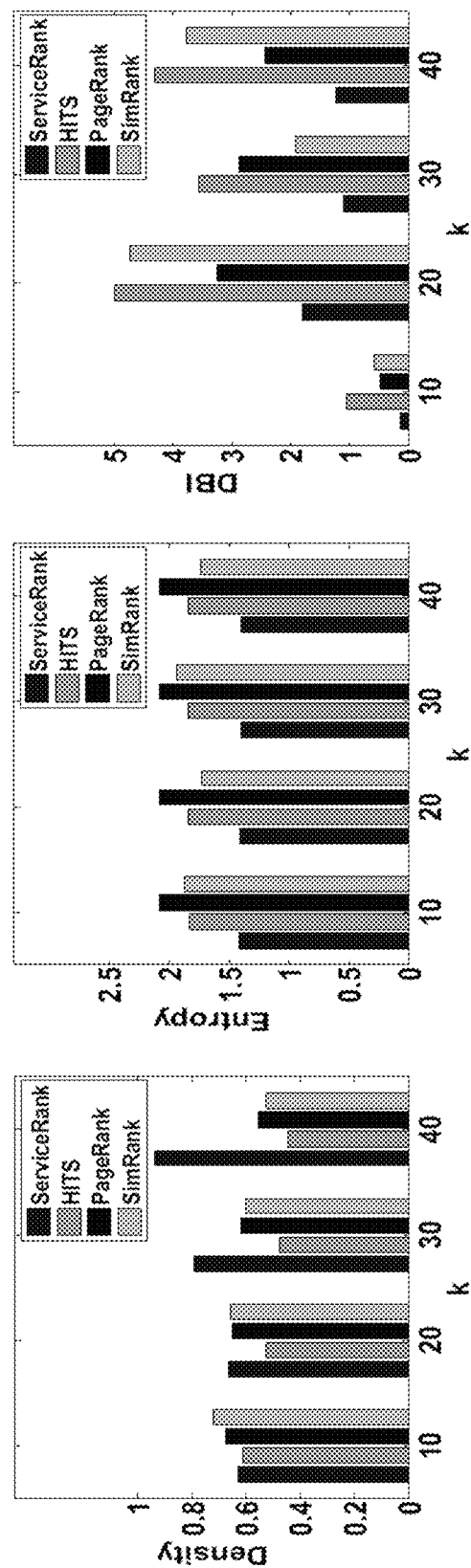
FIGS. 7-9 depict cluster quality comparison (respectively, density, entropy, and Davies-Bouldin index (DBI)), in accordance with an aspect of the invention.

Consider cluster quality evaluation. FIG. 7 shows the density comparison on BSBM 13,628 vertices by varying the number of clusters k=10, 20, 30, 40. The density values by ServiceRank are higher than that other three methods except for k=10. Note that in each group of four bars, ServiceRank is the leftmost, then HITS, PageRank, and SimRank. They remain in the range of 0.63 or above even when k is increasing. This demonstrates that ServiceRank can find densely connected components. Different from the disjoint clustering methods, the density value by the service influence based probabilistic clustering in accordance with one or more embodiments keeps increasing when k is increasing since each vertex is partitioned into more clusters with a larger k.

FIG. 8 presents the entropy comparison between four methods on BSBM 13,628 vertices. Note that again, in each group of four bars, ServiceRank is the leftmost, then HITS, PageRank, and SimRank. ServiceRank achieves the lowest entropy as compared to the other three methods. Entropy by ServiceRank is as low as less than 1.32 while entropy by other three approaches is still above 1.83 since they partition the service network without considering different degrees of importance for multiple types of links. As shown in FIGS. 7 and 8, the performance of ServiceRank is the best in terms of both density and entropy. This is because its distance function integrates the local optimal weight assignment for multiple types of structural and attribute links; thus it achieves good performance on both criteria. On the other hand, other three methods do not differentiate the links between different kinds of objects. It is equivalent to combine multiple types of structural and attribute similarities with the equal weighting factor of 1, which usually does not produce a good clustering.

FIG. 9 shows the DBI comparison on BSBM 13,628 vertices with different k values by four methods. Note that again, in each group of four bars, ServiceRank is the leftmost, then HITS, PageRank, and SimRank. ServiceRank has the lowest DBI of around 0.15-1.80, while PageRank, HITS and SimRank have a much higher DBI than ServiceRank. This demonstrates that ServiceRank can achieve both high intra-cluster similarity and low intercluster similarity.

Figure 11:
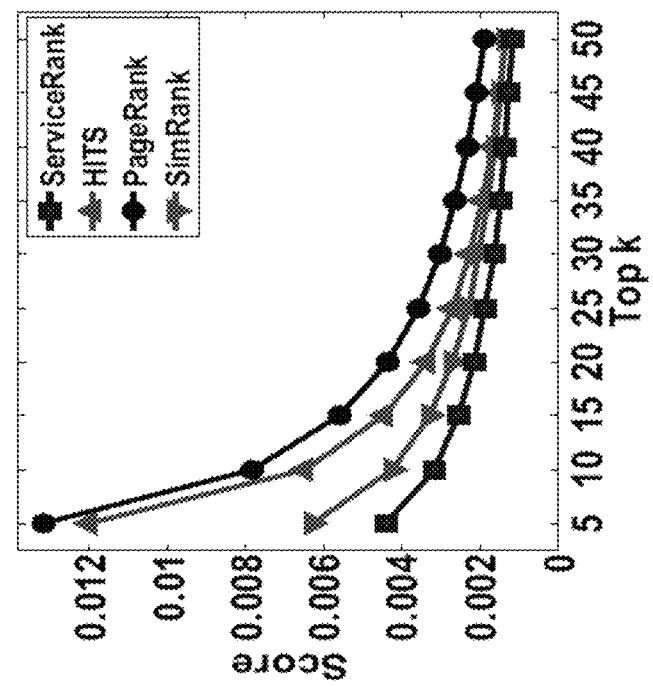
FIGS. 10 and 11 depict ranking quality comparison, in accordance with an aspect of the invention.
Figure 10:
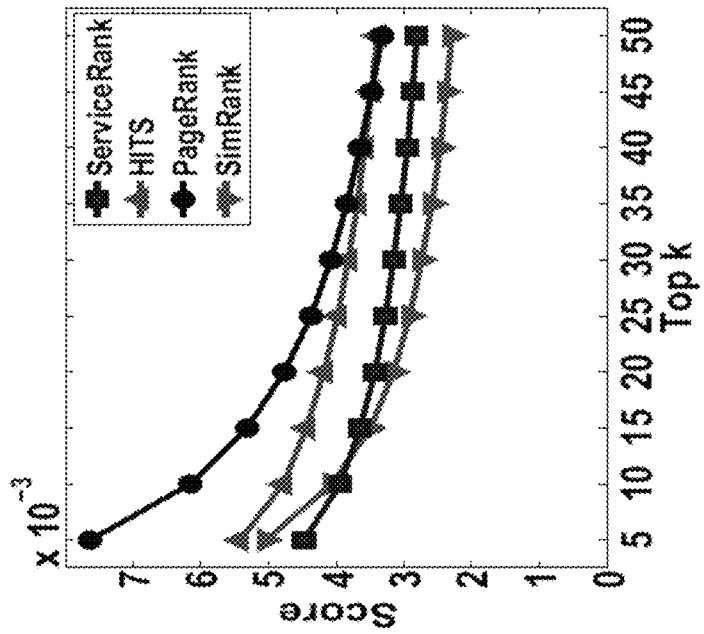

Consider ranking quality evaluation. FIGS. 10 and 11 plot the average ranking scores of top-k vertices in each cluster on two datasets, respectively. The score curve of ServiceRank with respect to k value is most stable among four ranking algorithms. Especially, the curve is almost a stable horizontal line when the k value stands in between 20 and 50. This is because ServiceRank achieves both the highest intra-cluster similarity and the lowest inter-cluster similarity. In addition, the iteratively updated ranking-based similarity between services makes the generated clusters get more cohesive intra-cluster structure and more homogeneous vertex properties. As a result, services within clusters are connected to similar services, providers and attributes so that they achieve similar ranking scores in terms of heuristics ranking rules. The quality by PageRank and HITS is lower since the resulted clusters without considering the weight assignment and the alternative iterations of clustering and ranking have a rather random distribution of services in terms of both structure and attribute similarities. Although SimRank also does not consider the weight assignment and the ranking iterations, the quality of SimRank stands in between since it iteratively updates the pairwise similarities.

Figures 12, 13:
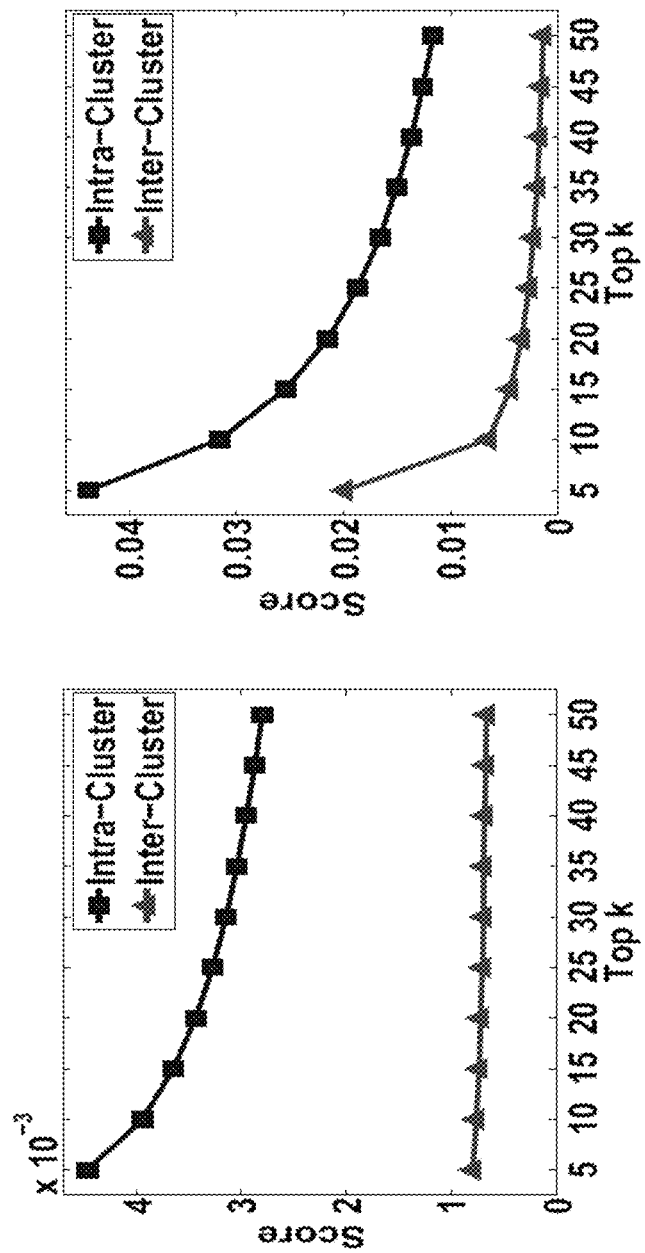
FIGS. 12 and 13 depict ranking accuracy comparison, in accordance with an aspect of the invention.

FIGS. 12 and 13 present the average ranking scores of services within clusters and services outside clusters by ServiceRank, respectively. Rank all services in each cluster and treat a service with a positive probability in cluster as the service within cluster. The score curve of services within clusters is much higher than that of services outside clusters since services within clusters are connected to many services, providers and attributes in clusters but there are few links between cluster and services outside cluster. During each iteration of clustering and ranking, the clustering iteratively refines the weights of multiple types of links in terms of their contribution. The updated ranking based similarity with the refined weights makes services with the similar cluster distribution and the similar ranking scores become more similar so that they will have a higher probability to be partitioned into the same clusters in the next iteration.

Figure 14:
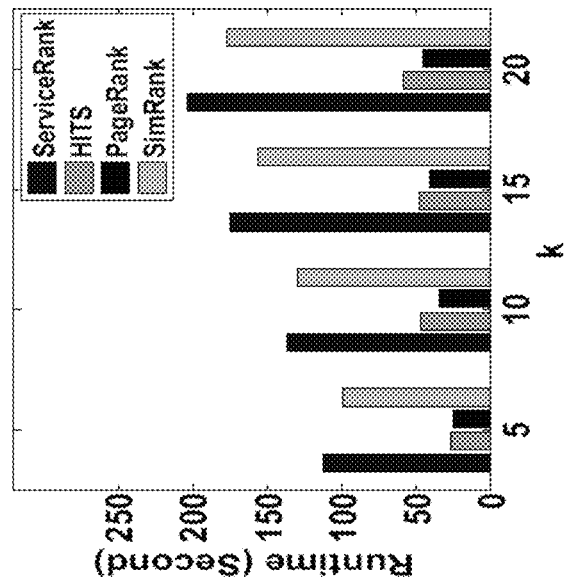
FIGS. 14 and 15 depict efficiency evaluation, in accordance with an aspect of the invention.
Figure 15:
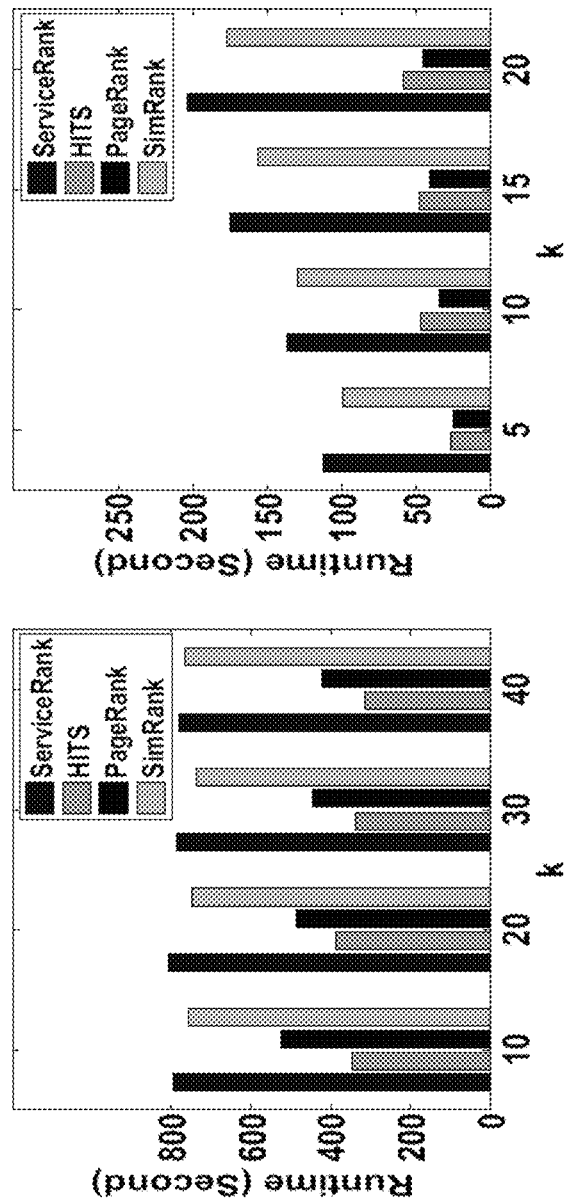

Consider efficiency evaluation. The running time by each algorithm for BSBM 13,628 vertices and IBM 3,378 vertices is summarized in FIGS. 14 and 15, respectively. Note that again, in each group of four bars, ServiceRank is the leftmost, then HITS, PageRank, and SimRank. As can be seen, HITS and PageRank are the most efficient as they execute both clustering and ranking algorithms only once on the homogeneous service network (i.e., without running the clustering matching and the alternative iterations of clustering and ranking) SimRank is usually 1.5-4 times slower than HITS and PageRank since it needs to iteratively update the pairwise similarities on the entire service network. Although ServiceRank does not need to update the pairwise similarities, it is about 1.05-1.16 times slower than SimRank. As ServiceRank needs to iteratively adjust the weights of multiple types of structure and attribute links, it iteratively computes the random walk distance matrix from scratch on the service network. In addition, service influence based clustering and ranking are iteratively performed so that the total cost of ServiceRank has been greatly increased. Although ServiceRank is more expensive, the iterative refinement improves the ranking quality quite a bit, as demonstrated in FIGS. 10-13.

Thus, one or more embodiments provide a unified neighborhood random walk distance measure integrating various types of link and attribute information with the local optimal weight assignment on a heterogeneous service network, and/or a reinforcement algorithm that tightly integrates ranking and clustering by mutually and simultaneously enhancing each other so that the performance of both can be improved. An additional greedy strategy is provided in at least some embodiments to efficiently execute cluster matching processes to align clusters for each type of object in the heterogeneous service network. Extensive evaluation on both synthetic and real service networks demonstrates the power of one or more embodiments in terms of the quality of both clustering and ranking.

Figure 16:
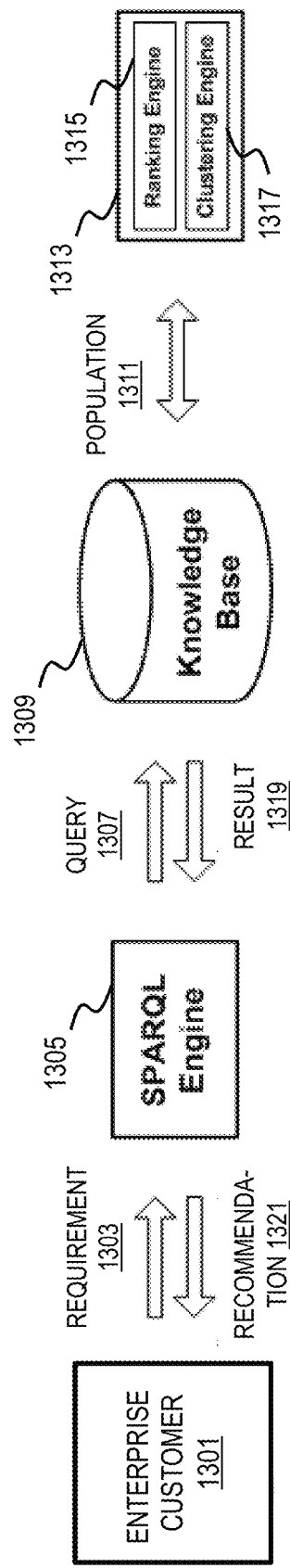
FIG. 16 depicts an exemplary system architecture, in accordance with an aspect of the invention.

Consider now the system architecture of FIG. 16. The population agent 1311 executes offline functionality-based co-ranking and clustering on the knowledge base 1309, using ranking engine 1315 and clustering engine 1317, as seen at 1313. The population agent places the result as semantic annotations to services or providers into the knowledge base 1309. Enterprise customer 1301 sends his or her query requirement to the SPARQL engine 1305, at 1303. The SPARQL engine executes the query strategy based on the user requirement on the knowledge base 1309, as at 1307. Return the user-required query result 1319 to the SPARQL engine. The SPARQL engine 1305 executes the next query and returns the ranked query result with the recommendation list 1321 based on the population annotations. Note that, typically, the search for a service does not stop after the first query; rather there is a series of queries to reduce the space of the selected and ranked services for the user.

Please note that SPARQL (a recursive acronym for SPARQL Protocol and RDF Query Language) is an RDF query language, that is, a query language for databases, able to retrieve and manipulate data stored in Resource Description Framework format. The SPARQL engine is a non-limiting example of a knowledge base querying module; other querying techniques could be used in other embodiments.

Figure 17:
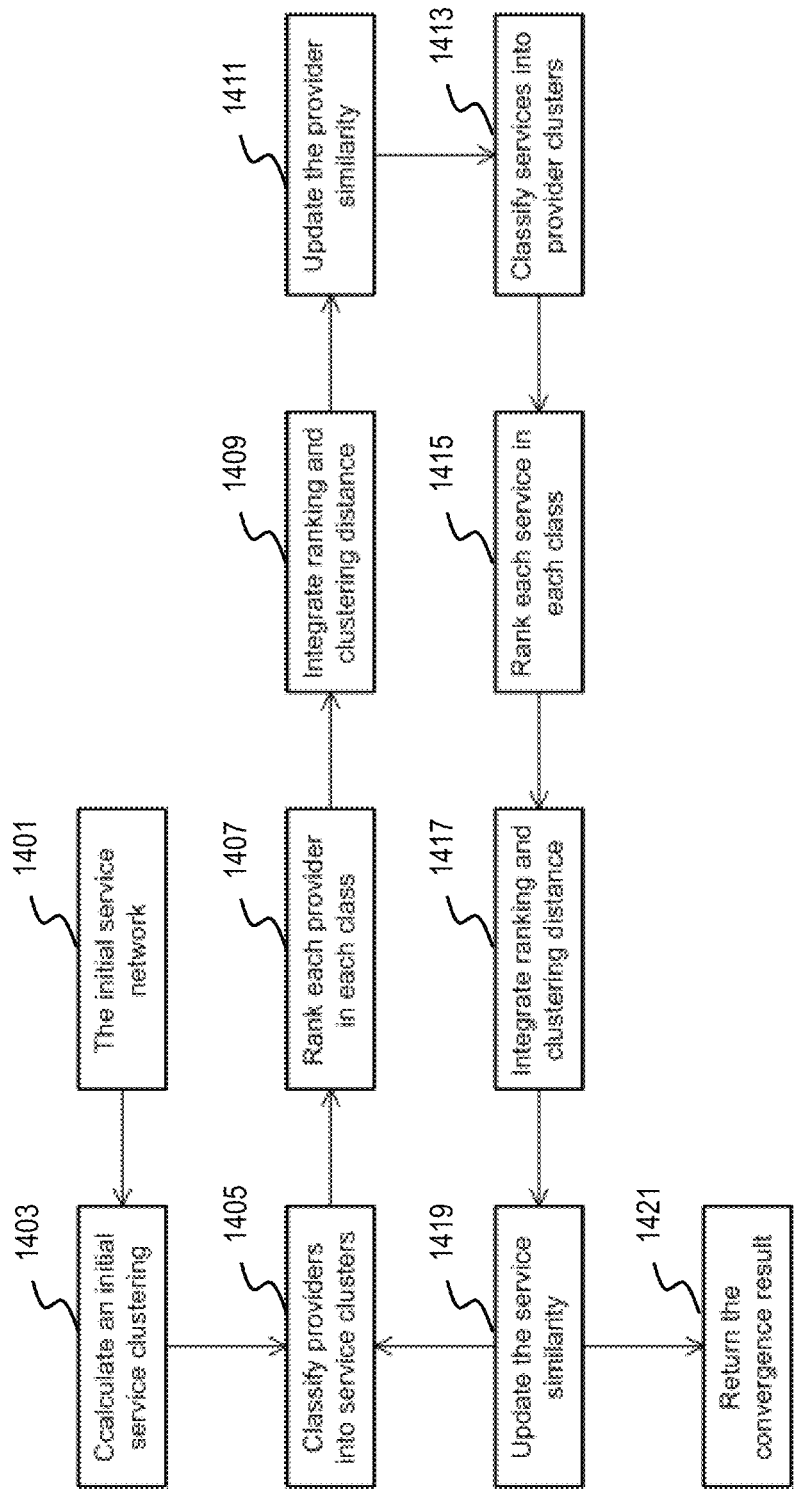
FIG. 17 depicts an exemplary flow chart, in accordance with an aspect of the invention.

Refer now to the flowchart of FIG. 17. Consider detailed offline steps of the hierarchical co-ranking methodology. Based on the initial adjacent matrix of the service network 1401, calculate an initial service clustering in step 1403. Examples of attributes within the adjacent matrix include, but are not limited to: number of clients for the service, number of clients for the provider, i.e., across all the provider's services, complexity and similarity of the service capabilities and NFR range (NFR=Non Functional Requirements (like scalability, security, temperature)), volume of utilization of the current service subscribers, relationship propagation: degree of connectivity within the services relationships, and the like. In step 1405, classify each provider into classes in terms of the service clustering. In step 1407, localized authority ranks each provider in each class. In step 1409, integrate the ranking-based distance between providers and the clustering-based distance between providers into a unified provider distance. In step 1411, update the original provider distance. That is to say, replace the original distance with the new one after combining the ranking-based distance between providers and the clustering-based distance.

In step 1413, classify each service into classes in terms of the provider clustering. In step 1415, localized authority ranks each service in each class. In step 1417, integrate the ranking-based distance between services and the clustering-based distance between services into a unified service distance. In step 1419, update the original service distance. As indicated by the feedback arrow from step 1419 to step 1405, repeat steps 1405-1419 until convergence; then return the convergence result in step 1421.

The exemplary embodiment described here contains a two-level hierarchical structure of attributes, i.e. the provider and the service. The hierarchical structure of attributes can have any number of levels depending on the real environment structure.

Consider now detailed online steps with automatic learning of the ranking weights. Based on the online service matching, for instance, an IR (information retrieval) similarity rank can be generated measuring the distance between the client query and the services descriptions. Integrate the online ranks with the off line authority rank for a final order of the search results:

$$ServiceRank_i = w_i \sum_j \frac{Rank_{i,j}}{Max_i\{Rank_{i,j}\}} \qquad (27)$$

where:
  j is the type of rank, e.g. (1) similarity rank and (2) authority rank (in an embodiment $j \subset \{1, 2\}$)
  i is one of the N services retrieved online, in an embodiment $i \subset \{1, \ldots, N\}$
  w is the weight of the rank that is automatically learned based on the historical customer service choice/vote out of the ordered list of search results.

Given the discussion thus far, it will be appreciated that, in general terms, an exemplary method, according to an aspect of the invention, includes the step of carrying out offline functionality-based co-ranking and clustering on a knowledge base 1309. The knowledge base characterizes a heterogeneous information technology services network including a plurality of services, a plurality of providers, and a plurality of attributes. This step can be carried out, for example, by the population agent 1313. A further step includes storing results of the functionality-based co-ranking and clustering as annotations of the services and the providers in the knowledge base 1309, to obtain an annotated knowledge base. This step can also be carried out, for example, by the population agent 1313. See generally element 1311 in FIG. 16.

A further step 1303 includes obtaining a service requirement from a customer 1301 requiring information technology services. This step can be carried out, for example, by a knowledge base querying module such as the SPARQL engine 1305. A further step 1307 includes querying the annotated knowledge base (annotated 1309), based on the service requirement. This step can also be carried out, for example, by a knowledge base querying module such as the SPARQL engine 1305. An even further step 1319, 1321 includes returning to the customer 1301 an ordered list of at least given ones of the services, based on the querying. This step can also be carried out, for example, by a knowledge base querying module such as the SPARQL engine 1305. As described elsewhere herein, a GUI can be employed, if desired, for communication with the customer 1301.

In some cases, the clustering includes service influence based probabilistic clustering based on a uniform neighborhood random walk distance measure, and the co-ranking comprises service influence based ranking. In a non-limiting example, the service influence based probabilistic clustering is implemented by analogy to heat diffusion.

In some cases, referring to FIG. 17, the step of carrying out offline functionality-based co-ranking and clustering on the knowledge base 1309 in turn includes, as at 1403, calculating an initial service clustering for the heterogeneous information technology services network 1401. This can be done with clustering engine 1317, for example. Also included, as at 1405, is classifying the providers into a plurality of service clusters. This can also be done with clustering engine 1317, for example. Yet further, also included, as at 1407, is, within each of the service clusters, ranking each of the providers. This can be done with ranking engine 1315, for example. Classes and clusters are used somewhat interchangeably in this discussion, as will be clear to the skilled artisan. Even further, also included, as at 1409, 1411 is integrating ranking and clustering distances between the providers into a uniform provider distance to obtain updated provider similarity. This can be done with population agent 1313, for example. Still further, also included, as at 1413, is classifying the services into a plurality of provider clusters. This can also be done with clustering engine 1317, for example. Yet further, also included, as at 1415, is, within each of the provider clusters, ranking each of the services. This can be done with ranking engine 1315, for example. Even further, also included, as at 1417, 1419 is integrating ranking and clustering distances between the services into a uniform service distance to obtain updated service similarity. This can be done with population agent 1313, for example.

Optionally, the steps 1405-1419 are repeated until convergence is achieved at 1421. In the above-discussed step of storing the results of the functionality-based co-ranking and clustering as annotations of the services and the providers in the knowledge base, to obtain the annotated knowledge base, the results can include the results of the convergence.

In another aspect, an apparatus includes a memory 28; and at least one processor 16, coupled to the memory, and operative to carry out or otherwise facilitate any one, some, or all of the method steps described.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks in the figures; e.g., as seen in FIG. 16, a knowledge base querying module such as SPARQL engine 1305 and a population agent module 1313 which may optionally include a ranking engine sub-module 1315 and a clustering engine sub-module 1317. In some embodiments, a suitable UI is provided in the form of a graphical user interface (GUI) comprising html served out to the browser of a user's computer. This UI could be separate or could be part, for example, of engine 1305 enabling communication with customer 1301. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules. The modules and/or sub-modules can include, for example, high-level code that is compiled or interpreted. The high-level code implements the logical steps shown in the figures and/or described in the equations and prose in the specification.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
carrying out offline functionality-based co-ranking and clustering on a knowledge base, said knowledge base characterizing a heterogeneous information technology services network comprising a plurality of services, a plurality of providers, and a plurality of attributes;
storing results of said functionality-based co-ranking and clustering as annotations of said services and said providers in said knowledge base, to obtain an annotated knowledge base;
obtaining a service requirement from a customer requiring information technology services;
querying said annotated knowledge base, based on said service requirement; and
returning to said customer an ordered list of at least given ones of said services, based on said querying, wherein said step of carrying out offline functionality-based co-ranking and clustering on said knowledge base comprises:
calculating an initial service clustering for said heterogeneous information technology services network;
classifying said providers into a plurality of service clusters;
within each of said service clusters, ranking each of said providers;
integrating ranking and clustering distances between said providers into a uniform provider distance to obtain updated provider similarity;
classifying said services into a plurality of provider clusters;
within each of said provider clusters, ranking each of said services; and
integrating ranking and clustering distances between said services into a uniform service distance to obtain updated service similarity.

2. The method of claim 1, wherein:
said clustering comprises service influence based probabilistic clustering based on a uniform neighborhood random walk distance measure; and
said co-ranking comprises service influence based ranking.

3. The method of claim 2, wherein said service influence based probabilistic clustering is implemented by analogy to heat diffusion.

4. The method of claim 1, further comprising:
repeating said steps of classifying said providers, ranking each of said providers; integrating said ranking and clustering distances between said providers, classifying said services, ranking each of said services, and integrating ranking and clustering distances between said services, until convergence is achieved;
wherein, in said step of storing said results of said functionality-based co-ranking and clustering as annotations of said services and said providers in said knowledge base, to obtain said annotated knowledge base, said results comprise results of said convergence.

5. The method of claim 1, further comprising providing a system, wherein the system comprises distinct software modules, each of the distinct software modules being embodied on a computer-readable storage medium, and wherein the distinct software modules comprise a knowledge base querying module and a population agent module; wherein:
said offline functionality-based co-ranking and clustering on said knowledge base is carried out by said population agent module executing on at least one hardware processor;
said storing of said results of said functionality-based co-ranking and clustering is carried out by said population agent module executing on said at least one hardware processor;
said obtaining of said service requirement from said customer requiring said information technology services is carried out by said knowledge base querying module executing on said at least one hardware processor;
said querying of said annotated knowledge base is carried out by said knowledge base querying module executing on said at least one hardware processor; and
said returning to said customer of said ordered list is carried out by said knowledge base querying module executing on said at least one hardware processor.

6. A computer program product comprising a computer readable storage medium having program instructions embodied therewith, the program instructions being executable by a processor to cause the processor to:
carry out offline functionality-based co-ranking and clustering on a knowledge base, said knowledge base characterizing a heterogeneous information technology services network comprising a plurality of services, a plurality of providers, and a plurality of attributes;
store results of said functionality-based co-ranking and clustering as annotations of said services and said providers in said knowledge base, to obtain an annotated knowledge base;
obtain a service requirement from a customer requiring information technology services;
query said annotated knowledge base, based on said service requirement; and
return to said customer an ordered list of at least given ones of said services, based on said querying, wherein said program instructions executable by said processor to cause the processor to carry out offline functionality-based co-ranking and clustering on said knowledge base comprise program instructions executable by said processor to cause the processor to:
calculate an initial service clustering for said heterogeneous information technology services network;
classify said providers into a plurality of service clusters;
within each of said service clusters, rank each of said providers;
integrate ranking and clustering distances between said providers into a uniform provider distance to obtain updated provider similarity;
classify said services into a plurality of provider clusters;
within each of said provider clusters, rank each of said services; and
integrate ranking and clustering distances between said services into a uniform service distance to obtain updated service similarity.

7. The computer program product of claim 6, wherein:
said clustering comprises service influence based probabilistic clustering based on a uniform neighborhood random walk distance measure; and
said co-ranking comprises service influence based ranking.

8. The computer program product of claim 7, wherein said service influence based probabilistic clustering is implemented by analogy to heat diffusion.

9. The computer program product of claim 6, wherein said program instructions further comprise program instructions executable by said processor to cause the processor to:

repeat said steps of classifying said providers, ranking each of said providers; integrating said ranking and clustering distances between said providers, classifying said services, ranking each of said services, and integrating ranking and clustering distances between said services, until convergence is achieved;

wherein, in said storing of said results of said functionality-based co-ranking and clustering as annotations of said services and said providers in said knowledge base, to obtain said annotated knowledge base, said results comprise results of said convergence.

10. An apparatus comprising:

a memory; and at least one processor, coupled to said memory, and operative to:

carry out offline functionality-based co-ranking and clustering on a knowledge base, said knowledge base characterizing a heterogeneous information technology services network comprising a plurality of services, a plurality of providers, and a plurality of attributes;

store results of said functionality-based co-ranking and clustering as annotations of said services and said providers in said knowledge base, to obtain an annotated knowledge base;

obtain a service requirement from a customer requiring information technology services;

query said annotated knowledge base, based on said service requirement; and return to said customer an ordered list of at least given ones of said services, based on said querying, wherein said at least one processor is operative to carry out said offline functionality-based co-ranking and clustering on said knowledge base by:

calculating an initial service clustering for said heterogeneous information technology services network;

classifying said providers into a plurality of service clusters;

within each of said service clusters, ranking each of said providers;

integrating ranking and clustering distances between said providers into a uniform provider distance to obtain updated provider similarity;

classifying said services into a plurality of provider clusters;

within each of said provider clusters, ranking each of said services; and integrating ranking and clustering distances between said services into a uniform service distance to obtain updated service similarity.

11. The apparatus of claim 10, wherein:

said clustering comprises service influence based probabilistic clustering based on a uniform neighborhood random walk distance measure; and said co-ranking comprises service influence based ranking.

12. The apparatus of claim 11, wherein said service influence based probabilistic clustering is implemented by analogy to heat diffusion.

13. The apparatus of claim 10, wherein said at least one processor is further operative to:

repeat said steps of classifying said providers, ranking each of said providers; integrating said ranking and clustering distances between said providers, classifying said services, ranking each of said services, and integrating ranking and clustering distances between said services, until convergence is achieved;

wherein, in said storing of said results of said functionality-based co-ranking and clustering as annotations of said services and said providers in said knowledge base, to obtain said annotated knowledge base, said results comprise results of said convergence.

14. The apparatus of claim 10, further comprising a plurality of distinct software modules, each of the distinct software modules being embodied on a computer-readable storage medium, and wherein the distinct software modules comprise a knowledge base querying module and a population agent module;

wherein:

said at least one processor is operative to carry out said offline functionality-based co-ranking and clustering by executing said population agent module on said at least one hardware processor;

said at least one processor is operative to store said results of said functionality-based co-ranking and clustering by executing said population agent module;

said at least one processor is operative to obtain said service requirement from said customer by executing said knowledge base querying module on said at least one hardware processor;

said at least one processor is operative to query said annotated knowledge base by executing said knowledge base querying module on said at least one hardware processor; and said at least one processor is operative to return to said customer said ordered list by executing said knowledge base querying module on said at least one hardware processor.

* * * * *